United States Patent
Weyh et al.

(10) Patent No.: US 7,468,293 B2
(45) Date of Patent: Dec. 23, 2008

(54) METHOD FOR THE PRODUCTION OF WINDOW ELEMENTS WHICH CAN BE SOLDERED INTO A HOUSING IN A HERMETICALLY TIGHT MANNER AND OF A WINDOW ELEMENT SEALING A HOUSING

(75) Inventors: Thomas Weyh, Stadtroda (DE); Elvira Gittler, Jena (DE); Wolfgang Brode, Hermsdorf (DE)

(73) Assignee: Jenoptik Laser, Optik, Systeme GmbH, Jena (DE)

( * ) Notice: Subject to any disclaimer, the term of this patent is extended or adjusted under 35 U.S.C. 154(b) by 204 days.

(21) Appl. No.: 11/420,310

(22) Filed: May 25, 2006

(65) Prior Publication Data

US 2006/0268400 A1  Nov. 30, 2006

(30) Foreign Application Priority Data

May 26, 2005 (DE) .................. 10 2005 024 512

(51) Int. Cl.
*H01L 21/44* (2006.01)
*H01L 21/48* (2006.01)
*H01L 21/50* (2006.01)

(52) U.S. Cl. .......................... 438/116; 438/64; 438/65; 438/68; 438/114; 257/680; 257/681; 257/E33.07; 257/E23.127

(58) Field of Classification Search ............... 257/680, 257/681, E33.07, E23.127; 438/64, 65, 68, 438/114, 116

See application file for complete search history.

(56) References Cited

U.S. PATENT DOCUMENTS

| 5,483,095 | A | 1/1996 | Kagawa et al. |
| 6,627,814 | B1 * | 9/2003 | Stark .......................... 174/539 |
| 2007/0108579 | A1 * | 5/2007 | Bolken et al. ................ 257/680 |

FOREIGN PATENT DOCUMENTS

| DE | 102 40 355 | 3/2004 |
| EP | 0 807 839 | 11/1997 |
| JP | 11-211555 | 8/1999 |
| JP | 2001-039528 | 2/2001 |

* cited by examiner

Primary Examiner—Ngan Ngo
(74) Attorney, Agent, or Firm—Reed Smith LLP

(57) ABSTRACT

In a method for the production of window elements which can be soldered into a housing in a hermetically tight manner and of a window element sealing a housing, the object of the invention is to achieve an improved hermetic sealing between window and housing through increased adherence and homogeneity in the metal coating and to prevent penetration of scattered light and unwanted radiation. Optically transparent, flat substrate material whose size is sufficient for a plurality of window elements is provided on at least one surface with an optical coating from which frame-like portions on a coated surface which enclose optically active surfaces of the window elements are subsequently removed, whereupon a metal coating that is used for producing a solder connection to the housing is applied to the generated portions having no coating, and the window elements are separated from the substrate material. An optical seal between a soldering layer system, which is associated with the metal coating, and the optical coating prevents penetration of unwanted radiation.

5 Claims, 2 Drawing Sheets

METHOD FOR THE PRODUCTION OF WINDOW ELEMENTS WHICH CAN BE SOLDERED INTO A HOUSING IN A HERMETICALLY TIGHT MANNER AND OF A WINDOW ELEMENT SEALING A HOUSING

This application claims priority of German Application No. 10 2005 024 512.9, filed May 26, 2005, the complete disclosure of which is hereby incorporated by reference.

BACKGROUND OF THE INVENTION a) Field of the Invention

The invention is directed to a method for the production of window elements which can be soldered into a housing in a hermetically tight manner and of a window element sealing a housing. Window elements of this kind are particularly suitable for closing housings of radiation detectors in a vacuum-tight manner while ensuring optical functions.

b) Description of the Related Art

Constructions of window elements which are soldered into housings of radiation detectors for the purpose of a gas-tight or vacuum-tight connection are known especially for infrared detectors, e.g., from JP 11-211555.

Generally, the windows can be optically coated in a mask. Next, a metal coating is applied to the masked areas on the surface and to the lateral edge of the window. The solder connection is later implemented by way of this metal coating. The metal coating can be applied chemically (JP 01-039528) or by sputtering (DE 102 40 355 A1).

A problem arising in this connection is the insufficient quality of the transitional area between the optical coating and metal coating. For example, residues of optical coating materials can lead to problems with adherence in the region of the metal coating which impair a tight soldering connection of the window to the detector housing. Further, application of the metal coating can interfere with the properties of the optical layers, e.g., due to adherence problems or entry of scattered light or unwanted light at defective locations.

OBJECT AND SUMMARY OF THE INVENTION

On this basis, it is the primary object of the invention to achieve an improved hermetic sealing between window and housing through increased adherence and homogeneity in the metal coating and to prevent penetration of scattered light and unwanted radiation.

According to the invention, this object is met through a method for the production of window elements which can be soldered into a housing so as to be hermetically tight, wherein optically transparent, flat substrate material (wafer) whose size is sufficient for a plurality of window elements is provided on at least one surface with an optical coating from which frame-like portions on a coated surface which enclose optically active surfaces of the window elements are subsequently removed, whereupon a metal coating that is used for producing a solder connection to the housing is applied to the generated portions having no coating, and the window elements are separated from the substrate material.

By optical coating is meant, e.g., coating materials which are transparent for a determined spectral region and opaque for other spectral regions so that filter functions can be realized. By optical coating is further meant antireflection coatings or interference layer systems for bandpass filters.

The selective removal of the optical coating for producing the required adherence foundation for the metal coating can be carried out by mechanical removal to a defined cutting depth or by etching. Mechanical removal can advantageously be combined with surface roughening.

After cleaning, the wafer is subjected to a complex coating process and removal process in which the remaining optical coating and the portions without coating are first completely provided with an adherence layer system which can be etched selectively with respect to the optical coating, and areas with the optical coating are subsequently covered by a lift-off mask before the entire surface is coated with a soldering layer system, whereupon the metal coating which is used to produce the solder connection to the housing results during the lift-off process, wherein the metal coating serves as a mask for etching the adherence layer system.

The adherence layer system which can be etched selectively with respect to the optical coating advantageously has an interdiffusion layer comprising aluminum and a barrier layer comprising titanium or a titanium alloy.

Two consecutive selective structuring processes afford the possibility of introducing layers through which optical functions and mechanical functions can be carried out. The layers can either be joined to the optically active layer or can be arranged on or under the optically active layer, they can exercise a shutter function or a filter function, or can cause scattered light to be absorbed or suppressed.

The interdiffusion layer which has a thickness of approximately 30 nm and is not closed ensures a very strong adherence because the aluminum is diffused directly in the boundary surface of the substrate material by the process energy during the coating process which is preferably carried out by sputtering. The barrier layer is an optical seal between the soldering layer system and the optical coating.

In a preferred embodiment of the invention, the soldering layer system contains an intermediate layer comprising platinum, or iron-nickel, or nickel, or palladium, and a closure layer comprising gold.

Optical layer systems which are to be applied especially in the infrared spectral region can advantageously have a germanium layer or a zinc sulfide layer as a top closing layer, so that the selectivity of the etching process of the adherence layer system relative to the optical layers can be increased.

By means of the invention in which a wafer, as optically transparent, flat substrate material, is initially processed in its entirety, i.e., subjected to a complex coating process and removal process and subsequently divided into individual window elements, these window elements can be produced with a predetermined geometry in which it is sufficient for purposes of a vacuum-tight housing closure to produce a solder connection between a metal deposition, which is applied exclusively to the front side of the window element, and the housing. This is because a surface coating without defects is achieved in that problem areas which impede a good adherence of the metal layers are reduced to a sufficient degree. In particular, the material of the optical coating is eliminated from the area provided for metallization in a simple, economical maimer, and a clean adherence foundation is provided.

Further, the invention ensures a very high precision in the production of the window elements because lithographic processes can be used to structure the optical coating and metal coating.

The invention is further directed to a window element which seals with respect to a housing and which has, on a window surface that is provided with an optical coating, a metal coating used for producing a solder connection to the housing, which metal coating comprises a base layer and a soldering layer system and is arranged on the window surface in a surface region having no optical coating and encloses the optical coating in a frame-like manner. The base layer comprises an interdiffusion layer and a barrier layer on top of the interdiffusion layer. The barrier layer produces an optical seal between the soldering layer system and the optical coating.

The invention will be described more fully in the following with reference to the schematic drawings.

DESCRIPTION OF THE PREFERRED EMBODIMENTS

Figure 1:
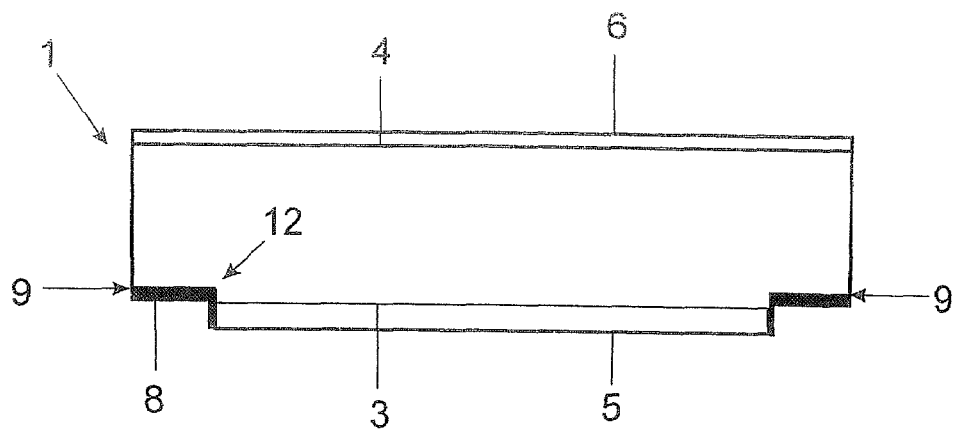
FIG. 1 shows a window element which is produced by the method according to the invention.
Figure 4:
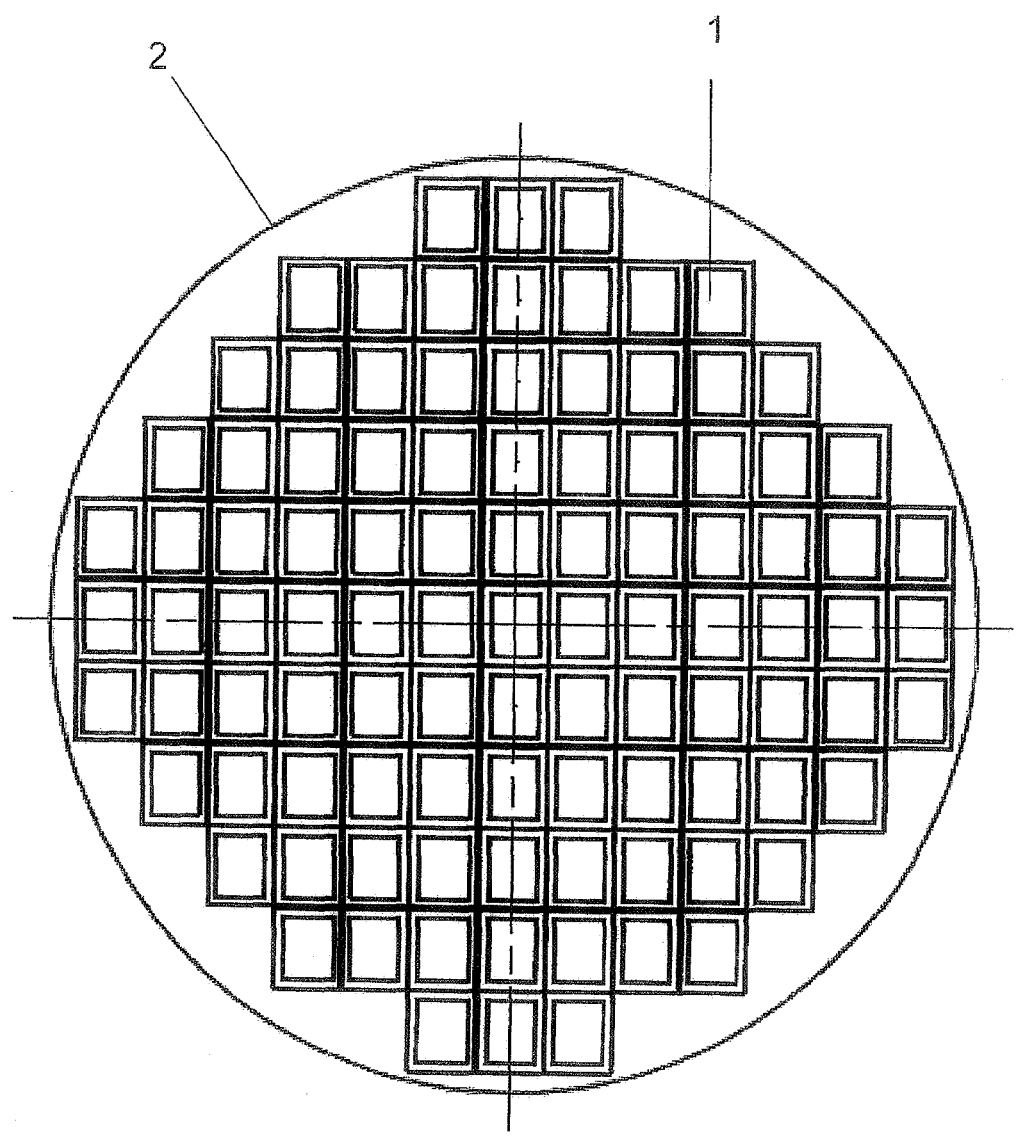
FIG. 4 shows a wafer of optically transparent, flat substrate material which is subjected to a complex coating process and removal process.

The widow element 1 which is shown in FIG. 1 is fashioned from an optically transparent, flat substrate material which is advantageously formed as a wafer 2 and whose size, with reference to FIG. 4, is sufficient for a plurality of window elements 1.

The window elements 1 which, according to the present invention, are not separated until after a complete coating process and removal process has been carried out, are provided with an optical coating 5, 6 on at least one, preferably both, of two oppositely located window surfaces 3, 4. One coated window surface 3 has a metal coating 8 which is used for producing a solder connection to a housing 7 (FIG. 2) and which is arranged on the window surface in a surface region 9 having no optical coating. The metal coating 8, which comprises an adherence layer system 10 as base layer and a soldering layer system 11, encloses the optical coating 5 as a window frame. A titanium barrier layer 13 associated with the adherence layer system 10 produces an optical seal between the soldering layer system 11 and the optical coating 5, in this instance in the angular area 12 that is shown more closely in FIG. 3. Penetration of unwanted radiation which impairs the function of the window element is effectively prevented in this way. An interdiffusion layer 14 associated with the adherence layer system 10 is provided beneath the barrier layer 13

Figure 2:
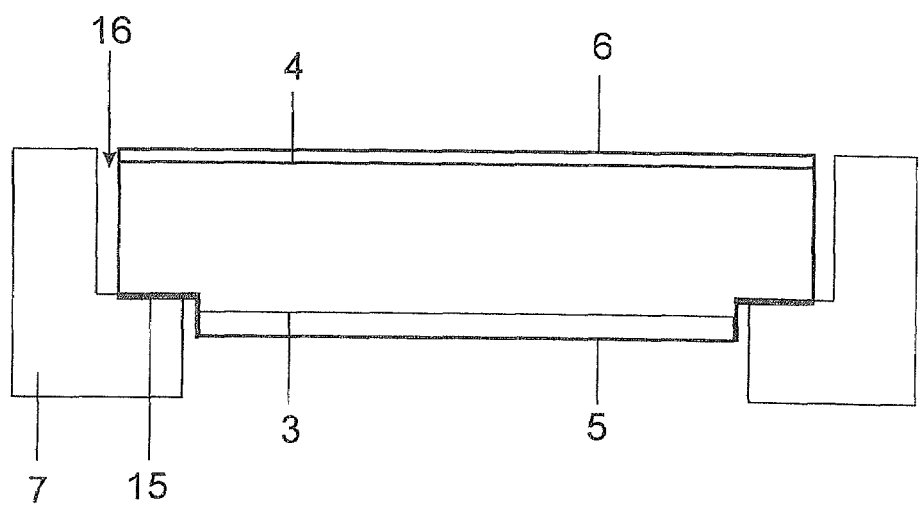
FIG. 2 shows the window element according to FIG. 1 installed in a housing.
Figure 3:
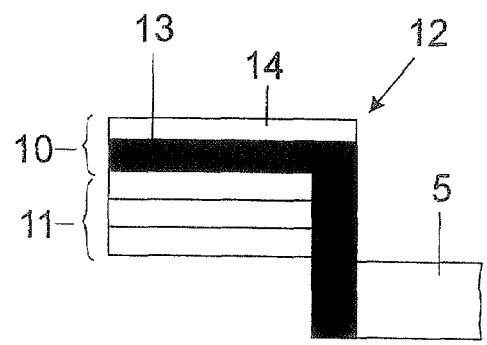
FIG. 3 shows the transition area between the soldering layer system and the optical coating.

As a result of the method according to the invention, it is sufficient for a hermetically tight connection between the window element 1 and the housing 7, shown only partially in FIG. 2, when a solder connection 15 between the frame-shaped metal coating 8 and the housing 7 is produced only at a front region of the window element 1. An additional lateral connection in the region designated by 16 is not necessary.

While the foregoing description and drawings represent the present invention, it will be obvious to those skilled in the art that various changes may be made therein without departing from the true spirit and scope of the present invention.

What is claimed is:

1. A method for the production of window elements which can be soldered into a housing so as to be hermetically tight, said method comprising the steps of:
   providing an optically transparent, flat substrate material whose size is sufficient for a plurality of window elements,
   providing an optical coating on at least one surface of each window element;
   removing frame-like portions of optical coating from the coated surface of each window element, wherein the frame-like portions enclose optically active surfaces of the window elements;
   providing the coated and uncoated portions of the at least one surface with an adherence layer system, wherein the adherence layer system can be etched selectively with respect to the optical coating;
   covering the portion of the at least one surface that has optical coating with a lift-off coating the entire at least one surface with a soldering layer system;
   removing the lift-off mask and thereby leaving a metal coating on the portions of the at least one surface without optical coating, wherein the metal coating is used to produce the solder connection with the housing, and wherein the metal coating serves as a mask for etching the adherence layer system; and
   separating the window elements from to substrate material.

2. The method according to claim 1, wherein the adherence layer system; has an interdiffusion layer comprising aluminum and a barrier layer comprising titanium or a titanium alloy.

3. The method according to claim 1, wherein the soldering layer system contains an intermediate layer comprising platinum, or iron-nickel, or nickel, or palladium, and a closure layer comprising gold.

4. The method according to claim 1, wherein the frame-like portions of the optical coating are removed by chemical means.

5. The method according to claim 1, wherein the frame-like portions of the optical coating are removed mechanically.

* * * * *